United States Patent [19]
Harris

[11] Patent Number: 5,936,800
[45] Date of Patent: Aug. 10, 1999

[54] UNIFORM FLY HEIGHT SLIDER WITH DECREASED SENSITIVITY TO ROLL MOMENTS

[75] Inventor: John F. Harris, Boulder, Colo.

[73] Assignee: Quantum Corporation, Milpitas, Calif.

[21] Appl. No.: 08/409,550

[22] Filed: Mar. 24, 1995

Related U.S. Application Data

[63] Continuation of application No. 08/133,685, Oct. 7, 1993, abandoned.

[51] Int. Cl.⁶ .............................. G11B 21/21; G11B 5/60
[52] U.S. Cl. .................................................. 360/103
[58] Field of Search ...................... 360/103, 104, 360/102, 122

[56] References Cited

U.S. PATENT DOCUMENTS

| | | | |
|---|---|---|---|
| 4,673,996 | 6/1987 | White ........................................ | 360/103 |
| 4,768,121 | 8/1988 | Nakashima et al. ..................... | 360/103 |
| 4,870,519 | 9/1989 | White ........................................ | 360/103 |
| 4,928,195 | 5/1990 | Ezaki et al. .............................. | 360/103 |
| 5,134,531 | 7/1992 | Matsuzaki et al. ...................... | 360/103 |
| 5,136,444 | 8/1992 | Maki et al. ............................... | 360/103 |
| 5,187,623 | 2/1993 | Ibaraki ..................................... | 360/103 |
| 5,327,311 | 7/1994 | Ananth et al. ........................... | 360/103 |

FOREIGN PATENT DOCUMENTS

| | | | |
|---|---|---|---|
| 56-22217 | 3/1981 | Japan ....................................... | 360/103 |
| 56-159865 | 12/1981 | Japan ....................................... | 360/103 |
| 57-20963 | 2/1982 | Japan . | |
| 60-242548 | 12/1985 | Japan ....................................... | 360/103 |
| 3-125378 | 5/1991 | Japan ....................................... | 360/103 |
| 3-132910 | 6/1991 | Japan ....................................... | 360/103 |
| 3-157861 | 7/1991 | Japan ....................................... | 360/103 |
| 4-325975 | 11/1992 | Japan ....................................... | 360/103 |
| 5-28685 | 2/1993 | Japan ....................................... | 360/103 |

*Primary Examiner*—David L. Ometz
*Attorney, Agent, or Firm*—John M. Gunter; William J. Kubida; Holland & Hart LLP

[57] ABSTRACT

An improved slider with controlled fly height and decreased sensitivity to externally applied roll moments. In a two rail embodiment, one of the rails has transverse pressure contourization or edge blend and the other rail has a simple, wide air bearing surface located at the edge of the slider body for maximizing the distance between the rails. The combination of the two rails results in a stiffer slider with increased manufacturing yields.

13 Claims, 3 Drawing Sheets ns. 08/133,685,
UNIFORM FLY HEIGHT SLIDER WITH DECREASED SENSITIVITY TO ROLL MOMENTS

This is a continuation of application Ser. No. 08/133,685, filed Oct. 7, 1993 and now abandoned.

BACKGROUND OF THE INVENTION

The present invention relates, in general, to two rail sliders, and in particular, to a stiffer slider structure supporting a computer storage transducer in a rotary actuated disk drive.

Today, technology is driving the miniaturization of every component. For a computer mass storage device incorporating a rotating storage medium, both the media and the slider are rapidly shrinking. A few years ago, 5.25 in. disks with 100% sliders were common. Today 3.5 in. disks are popular with 1 in. disks on the horizon. Sliders have likewise become smaller. Today 50% sliders (i.e. one half the length and width of the 100% sliders) are becoming common with 35% sliders on the horizon.

As these components become smaller, the tolerances associated with the manufacture of the miniaturized product become harder to maintain with the result that the actual product performance can vary over a wide range. Moreover, the smaller product may create or exacerbate known problems. For example, in designing a slider which "flies over" the media, a suitable flying envelope is needed. This envelope identifies a maximum to minimum fly height taking into account all manufacturing tolerances and performance fluctuations. Flying outside the envelope may result in potentially significant errors such as the transducer not being able to pick up the signals from the media; alternatively, if the flying height is too close, slider crashes may result.

Fluctuations in flying height across the disk are due primarily to the higher relative disk speed at the outer diameter (OD) than at the inner diameter (ID) and the yaw angle as the slider is moved by the rotary drive across the media. With increasing miniaturization, the increase in yaw angles from the ID to the OD are substantial. These increases exacerbate the fly height problems and thus require better design and greater latitude for manufacturing tolerances.

One prior art solution to constant fly height involves transverse pressurization contour (TPC) rails symmetrically disposed across the width of the slider. Two rails are provided and each of the rails are similarly treated, i.e. they have contours on each side of the air bearing surface for reacting to the air pressure created by the moving media. Ideally, a TPC slider flies at a constant height irrespective of the yaw. TPC, however, suffers from the disadvantage that manufacturing variations may cause substantial changes to fly height; much greater than desired or tolerated by the designer.

In addition, as the slider shrinks in size, the use of TPC results in rails which are increasingly closer to each other causing significant stiffness and externally applied roll moment problems. Roll moments can be externally applied or internally generated. Externally applied roll moments may be due to bent suspension flexures, wires misaligned on the slider or a misapplied load point; internally generated roll moments are determined by the geometry of the slider itself.

Finally, with TPC, numerous surfaces must be precisely shaped over the entire slider width resulting in significant yield problems. For example, defining TPC width dimensions through the use of photolithographic techniques along with chemical etching, reactive ion etching or ion milling, increases the number of defects which may occur in the manufacturing process thus lowering the yield of the sliders.

SUMMARY OF THE INVENTION

It is a primary object of the invention to provide a stiffer slider.

It is another object of the invention to provide a slider which overcomes the prior art problems and has decreased sensitivity to externally applied roll moments.

It is a further object of the invention to provide a slider which has less sensitivity to manufacturing tolerances.

It is a feature of the invention to provide a slider which has the above characteristics and operates within a designer's envelope for fly height variations.

It is an advantage of the invention to provide a slider with increased yields.

To address the deficiencies of the previously described sliders while also achieving the objects, features, and advantages and in accordance with the purposes of the invention, as embodied and broadly described herein, a slider is provided in which a first rail is positioned near the edge of the slider body and a second rail is disposed as far as possible from the first rail at the opposite edge of the slider body. The first rail may have TPC or edge blend adjacent to the air bearing surface and functions to dominate the fly height characteristics of the slider; the second rail functions to minimize the effects of externally applied roll moments. The synergistic effect of the combined rails provides for a stiffer slider.

BRIEF DESCRIPTION OF THE DRAWINGS

This invention is pointed out with particularity in the appended claims. The above and further objects, features, and advantages of the invention may be better understood by referring to the following descriptions taken in conjunction with the accompanying drawings, in which:

DETAILED DESCRIPTION OF AN ILLUSTRATIVE EMBODIMENT

Figure 1:
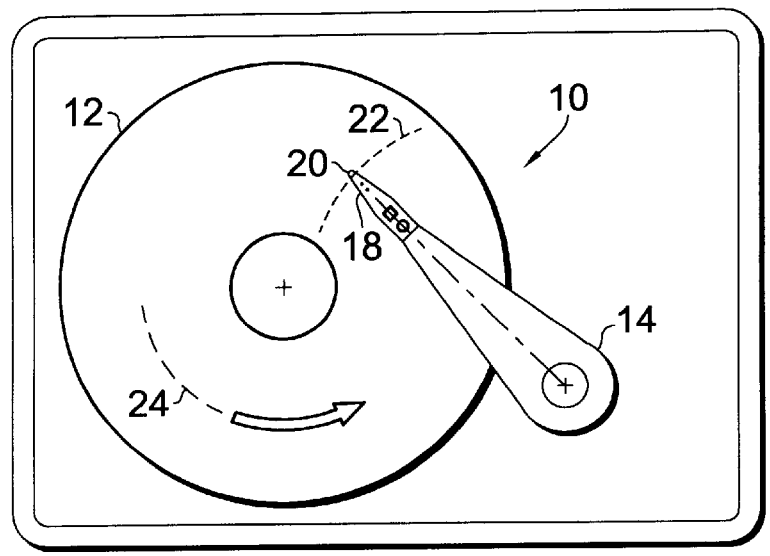
FIG. 1 is a simplified plan view of a computer mass storage device utilizing a rotary actuator for positioning a slider with respect to the surface of a rotating media.

With reference to FIG. 1, a rotary arm actuator disk drive 10 is shown. Rotary drive 10 may be part of a mass storage system. Drive 10 includes a rotating media 12 which may be an optical or magnetic disk. Media 12 is traversed by a suspension arm assembly 14 which is pivotally mounted for movement between the inside diameter (ID) and the outside diameter (OD) of the media 12. Suspension arm assembly 14 is well known and includes at least one suspension arm 16 which is coupled to a slider 18. Suspension arm 14 imparts a force on slider 18 which pushes the slider towards the media 12 as the slider flies over the media. The force is measured as a gram load and helps to control the fly height of slider 18.

In the preferred embodiment, slider 18 is an elongated, planar body having two air bearing surface rails between a leading and trailing edge. Before being processed, a blank slider's overall dimensions (height, width and length) are generic, i.e. the dimensions are determined by industry. The form factors today are 100%, 70% and 50%. A 50% slider means that the slider is one half the height, length and width of the 100% slider. While the slider's initial size is predetermined, as the slider is processed and shaped, it obtains characteristics that are unique to the particular manufacturer.

At the trailing end of the slider 18 is a transducer 20 which creates a magnetic field with media 12. Transducer may be any well known type and performs read and write operations on the information stored by media 12. Slider 18 and transducer 20 are moved almost radially 22 across media 12 to read information from a number of tracks, one of which is shown at 24.

Figure 2:
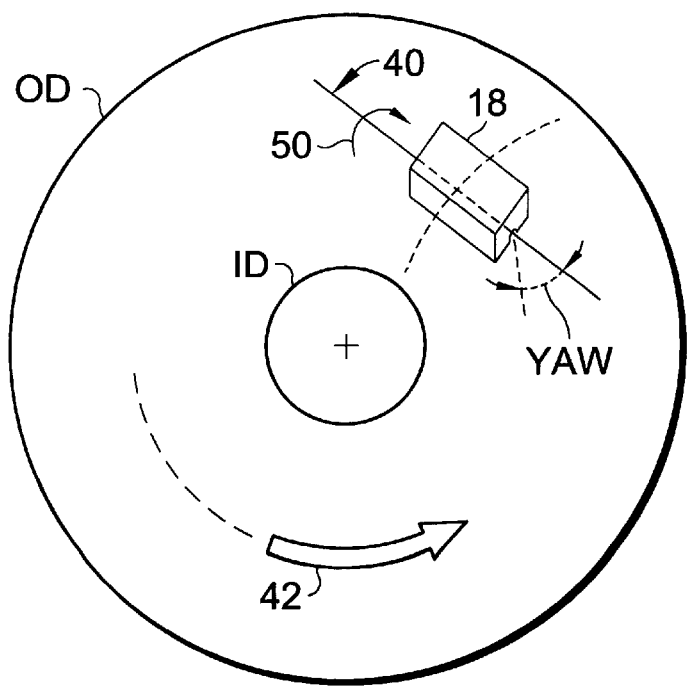
FIG. 2 is a simplified, partially cut away plan view of a slider flying over the rotating media and illustrative of the yaw angles created by the suspension arm swinging from the media's inside diameter to its outside diameter.

FIG. 2 shows an exaggerated slider 18 as it flies over the disk 12. As the slider moves from the ID to the OD, the longitudinal axis 40 of the slider 18 changes vis-a-vis the air currents created by the direction of rotation 42 of the media 12. This angular difference is called the yaw angle. In the preferred embodiment, the yaw angle at the ID will be close to zero and the yaw angle at the OD will be 20 degrees or less. In the preferred embodiment, yaw becomes an increasing factor as the slider 18 moves towards the OD. When the slider 18 is nearer the ID of the media, the velocity of the media as it applies to the slider 18 is a major determinant of the fly height.

In addition FIG. 2 shows a roll moment 50 torque. Roll moment is the torque being applied to the slider 18. Roll moment is calculated as the force on each rail times its distance to a center position. Imperfections in the manufacturing process, such as a bent flexure or a misaligned pivot spring, or externally generated events cause roll moments which result in the tendency of the slider to roll. With the distanced rails provided in the preferred embodiment, less roll will occur.

Roll stiffness may also be affected by the load from the suspension unit and the distance between the air bearing surfaces. The higher the gram load from the suspension arm, the greater the slider stiffness; however, the higher the gram load the greater the wear of the slider since it lands on the media when the mass storage system is not in use. Thus it is also desirable to increase roll stiffness by spacing the rails further apart.

The outer rail of the slider has a transducer at its trailing edge. For signal integrity, it is important to maintain the trailing edge of the outer rail at as constant a fly height as possible. The inner rail may generally be higher than the outer rail so as to avoid crashes with the disk. As will become apparent from a description of FIG. 3, the preferred embodiment of the present invention provides exactly these characteristics.

Figure 3:
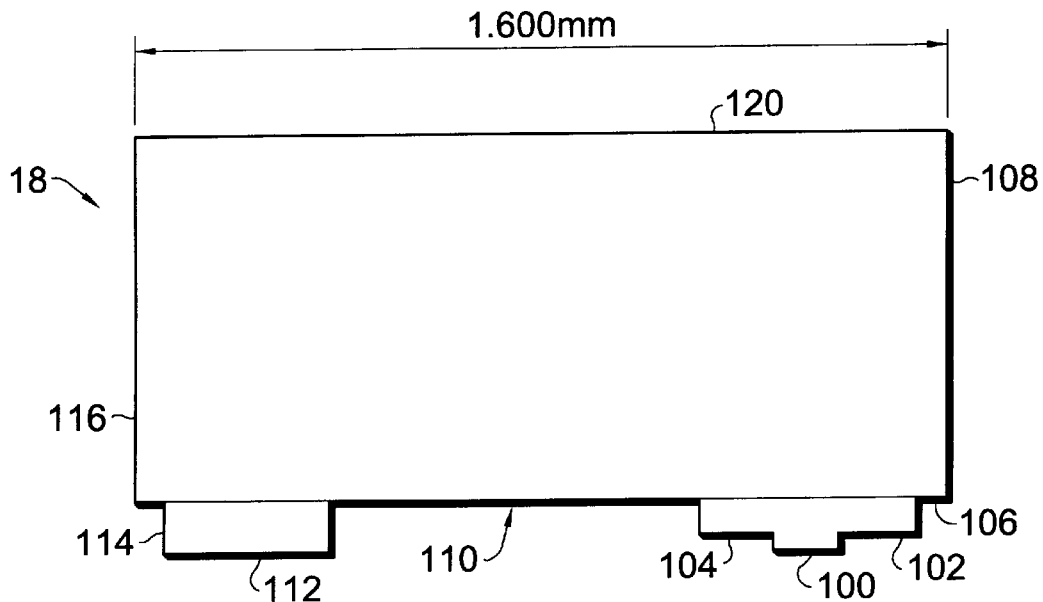
FIG. 3 is a front view of the width of the slider in accordance with the present invention illustrating the two rails and the relative distances between each surface.

In FIG. 3, a detailed view of the width of slider 18 is provided. The slider width is 1.6 millimeters which is generic in the industry for a 50% slider. Slider 18 is generally in the form of a rectangular or elongated planar body with a leading edge 120 and a trailing edge (not shown). Disposed between the edges are an outer rail 100 which is the first rail providing an air bearing surface. On either side of rail 100 are slightly recessed contours 102 and 104. In the preferred embodiment these contours 102,104 are recessed about 1.3 microns from the rail 100. The combination of the air bearing rail and the contours enables fly height control. More specifically, as the slider is moved towards the outer diameter of the disk, the increasing yaw angle causes increased pressure under outside contour 102 which acts to efficiently pressurize the outer rail 100. The yaw flow into the inside contour 104 is expansive, causing subambient pressure. Overall, the effect of the two contours is to give better fly height control to the slider from the inside diameter to the outside diameter.

Contour 102 has a width of 0.083 millimeters (mm). Contour 104 has a width of 0.210 mm. The contours are generally made by photolithographic techniques though any process can be suitable.

Adjacent to contour 102 is a shoulder 106 which ends at the longitudinal edge 108. Shoulder 106 is generally formed from a saw cut. Shoulder 106 has a width of 0.025 mm and a depth much deeper than the TPC contours. The function of shoulder 106 is to more accurately locate the air bearing surface (ABS); the shoulder should be as narrow as possible. Any aerodynamic support by the shoulder to the slider is minimal.

On the opposite side of contour 104 is an ambient recessed slot 110. Slot 110 has a depth from the rails which is sufficient to ensure that it has little or no effect on the flying characteristics of the slider. In the preferred embodiment, slot 110 has a width of 0.814 mm. As the width of slot 100 increases, it provides greater roll stability to the slider 18.

Abutting slot 110 is second rail 112 which is the inner rail air bearing surface. Inner rail 112 is a simple tapered rail with no etching or other processing performed on it. As a result there is little manufacturing variations or defects. This helps to obtain overall higher yields for slider 18. Rail 112 is somewhat wider than rail 100; since the air flow velocity on the air bearing surface at the ID is less than at the OD, this wider rail helps to provide additional lift. Rail 112 is ideally located as far as possible from rail 100. This distance enhances the ability of the slider 18 to withstand roll moments and improves the stiffness of the slider 18.

Adjacent to rail 112 is shoulder 114 which abuts the opposite longitudinal edge 116. Shoulder 114 is also a saw cut and performs the same function as shoulder 106. Ideally, shoulder 114 should be eliminated so that inner rail 112 is at the longitudinal edge and providing maximum separation from the outer rail 100.

Figure 4:
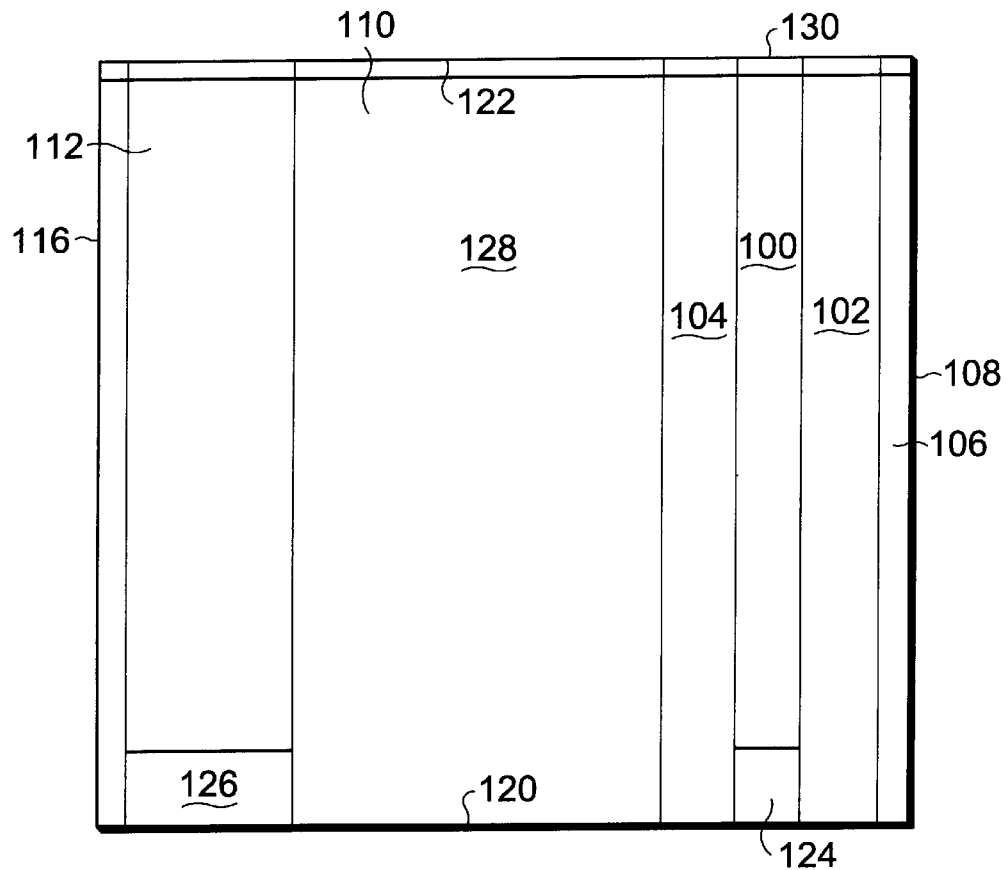
FIG. 4 is a top view of the slider illustrating the various transverse sections of the slider.

FIG. 4 shows a top view of slider 18. As previously described, rails 100 and 112 longitudinally traverse from the leading edge 120 to the trailing edge 122. Outer rail 100 has a front tapered portion 124 and inner rail 112 has a similarly angled tapered portion 126. The taper extends to 0.196 mm and is at a 38 minute angle. The function of the taper is to create lift. As the air is moved by the media, it creates pressure vis-a-vis the air bearing surfaces of the slider 18 resulting in lift. Slider 18 is connected to the suspension arm by means of a pivot point 128, located on the back side of the slider. Pressure from the suspension arm is provided to the pivot point which provides a predetermined amount of force to the top of the slider 18. This causes the slider 18 to fly closer to the media 12. Pivot point 128 is located off center and towards the outer rail 100 and helps to balance some of the internal roll moments of the slider 18 that are due to velocity differences between the two rails.

At the trailing edge of outer rail 100 is located the transducer 130. Transducer 130 forms a magnetic circuit with the media 12 and performs read and write operations.

Taking FIG. 2 through 4 together the operation of rotary drive 10 having a slider 18 can be appreciated. At start up, slider 18 rests on the surface of media 12. The tapered edges 124 and 126 create an initial air bearing to media 12 as it begins to rotate. Assuming that the slider is over the ID, the slider is nearly in line with the air currents generated by the rotation of the media 12. At start up, rails 100 and 112 provide the greatest lift to slider 18 with the suspension arm 14 providing a downward force to the slider 18 via pivot point 128. As the slider is moved towards the OD, the yaw angle increases. The outer rail 100 together with contours 102 and 104 dominate the fly height for the slider 18. More particularly, outer contour 102 has significant pressure created by the positive yaw angle. Inner contour 104 has a subambient pressure; with inner contour being larger than outer contour an equilibrium is created which maintains the trailing edge of outer rail 100 at a nearly constant fly height over the disk.

Inner rail 112 initially flies higher as the slider 18 is moved from the ID to the OD until the yaw angle becomes substantial resulting in less pressure on the full surface of the inner rail 112. Consequentially, a humped flying curve results with the inner rail flying closer to the media at the ID and OD and somewhat higher at the midpoint of the media 12. The outer rail, however, is not significantly affected by the increased yaw angle. It dominates the fly height characteristics of the slider at the transducer 130. Transducer 130, which is at the trailing edge of outer rail 100, is maintained at a reasonably constant distance to the disk 12 and within the normal designer's envelope. Transducer 130 thus can produce fairly constant signals which minimize errors in the reading and writing of information.

Figure 5:
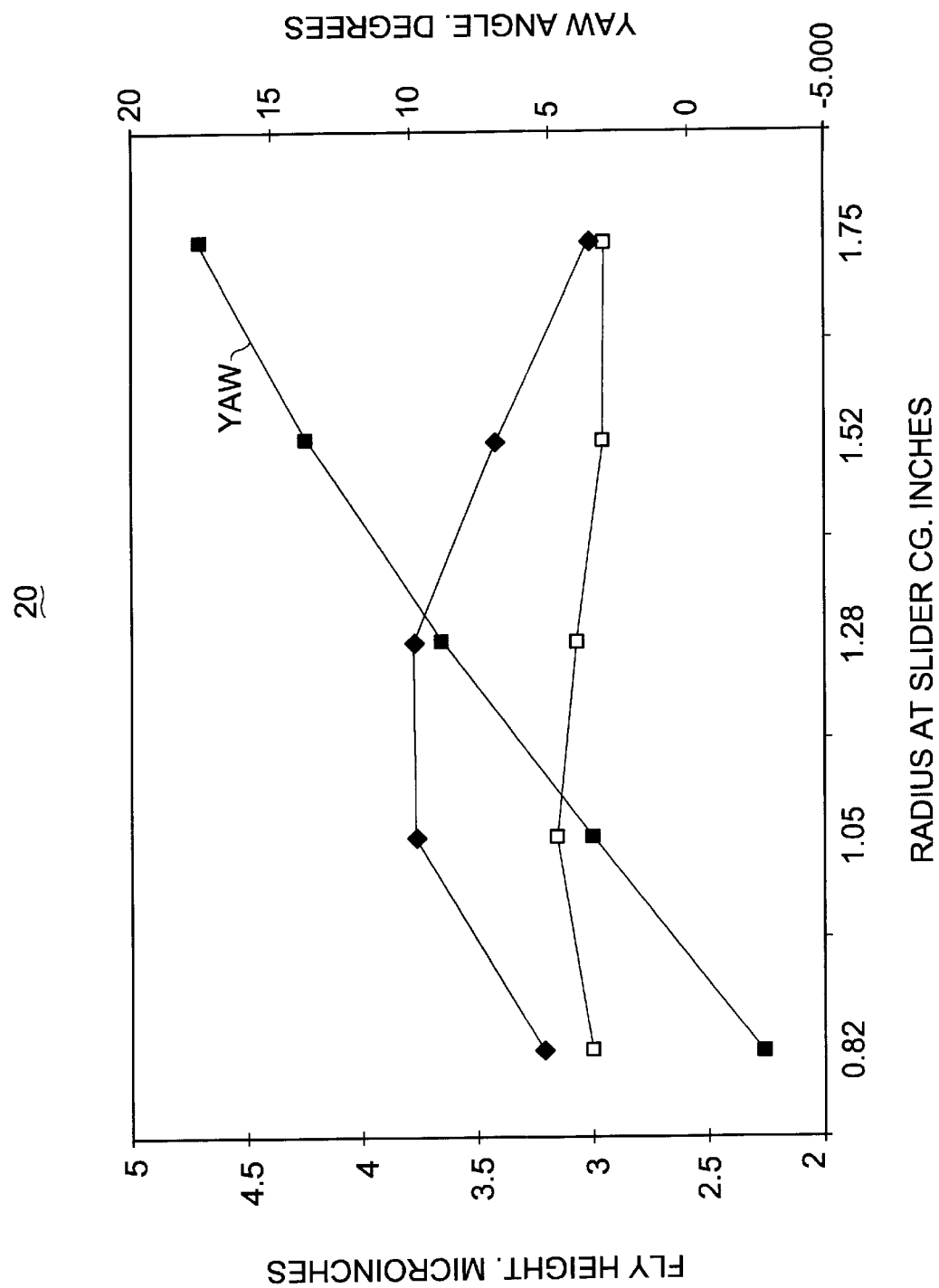
FIG. 5 is a graphic representation of the fly height characteristics of the preferred embodiment of the two rail slider described in the present invention.

FIG. 5 shows the fly height characteristics of the outer rail 100. As is shown, there is a hump in the flying height of the outer rail 100 of slider 18 with the highest flying height being towards the center of the media and a lower flying height towards the ID and the OD. This hump is well within the tolerance range of the designer. The inner rail 112 flies higher than the outer rail and is similarly affected by the movement across the media. Moreover, with this design, greater manufacturing tolerances are mitigated while still having the slider fly within the designer's envelope.

It is the object of the appended claims to cover all variations and modifications as come within the spirit and scope of the invention. For example, instead of TPC contours 102 and 104, an edge blend providing shaped edges may be used. In an alternative embodiment, it is possible to have the inner rail substantially the same width as the outer rail or even smaller than the outer rail while still coming within the spirit of the invention. Another alternative embodiment allows greater manufacturing flexibility by providing the inner rail with a narrow etched or milled shoulders in order to more closely control the air bearing surface width. This step, approximately 10 micrometers wide, between the shoulder and the inner rail allows for greater rail definition with little additional fly height control. The step angle is significantly greater than that previously known. Finally, the teachings of the invention can also be applied to three rail sliders.

What is claimed as new and desired to be secured by Letters Patent of the United States is:

1. A uniform fly height slider for reading and writing data on a planar rotating data storage medium, said slider comprising:

a generally rectangular body having a length identified by leading and trailing edges relative to rotation of the medium;

said body having an inner longitudinal edge traversing from said leading to trailing edges and located adjacent to said center of rotation of the medium;

said body having an outer longitudinal edge traversing from said leading to trailing edges and spaced from said inner longitudinal edge;

outer and inner air bearing surfaces extending parallel to each other and traversing from said leading to trailing edges;

said outer air bearing surface being spaced from said outer longitudinal edge of said body;

said inner air bearing surface being coincident with said inner longitudinal edge of said body to maximize the distance between said outer and inner air bearing surfaces;

an outer fly height control contour situated on an outer edge of said outer air bearing surface adjacent to said outer longitudinal edge of said body and traversing from said leading to trailing edge, said outer contour being recessed from said outer air bearing surface;

an inner fly height control contour situated on an inner edge of said outer air bearing surface and traversing from said leading to trailing edge, said inner contour being recessed from said outer air bearing surface; and a shoulder situated between said outer contour and said outer longitudinal edge of said body and traversing from the leading edge to the trailing edge, said shoulder being recessed from said outer contour.

2. The slider as defined in claim 1 wherein said outer air bearing surface and said inner and outer contours equal an outer rail, said outer rail forming approximately ⅓ the width of said body.

3. The slider of claim 2 wherein said outer rail has a width ranging between 20–40% of the width of said body.

4. The slider of claim 3 wherein the width of said outer contour is substantially less than the width of said inner contour.

5. The slider of claim 2 wherein said inner air bearing surface has a width approximately ⅛ of the width of said body.

6. The slider of claim 5 wherein said inner air bearing surface ranges between 10 and 20% of the width of said body.

7. The slider as defined in claim 1 and further including:

a tapered front portion for each of said outer and inner air bearing surfaces;

a transducer attached to said outer air bearing surface adjacent to said trailing edge; and an ambient pressure slot located between said outer and inner air bearing surfaces and recessed substantially below said outer and inner air bearing surfaces, the width of said ambient pressure slot comprising approximately 50% of the width of said body.

8. A slider connected to a suspension arm for flying over a rotating planar media, said suspension arm applying a load force to force said slider in a direction toward a surface of said rotating media, said slider traversing said surface of said rotating media in an arcuate plane between an outer and an inner diameter of said rotating media, said slider comprising:

an elongated planar body having an outer and an inner longitudinal air bearing member relative to said outer and inner diameters of said rotating media, said air bearing members traversing between a leading and trailing edge of said body, and said air bearing members facing said surface of said media;

said elongated planar body having an outer and an inner longitudinal edge relative to said outer and inner diameters of said rotating media;

said outer air bearing member being spaced from said outer longitudinal edge of said body for controlling the fly height of a transducer that is carried by said outer air bearing member at a location adjacent to said trailing edge;

said inner air bearing member being disposed coincident with said inner longitudinal edge of said body for minimizing the effect of externally applied roll moments to said slider;

an outer planar contour situated at an outer edge of said outer air bearing member and adjacent to said outer longitudinal edge of said body and traversing from said leading to trailing edge of said body, said outer contour being recessed from said outer air bearing member;

an inner planar contour situated at an inner edge of said outer air bearing member and traversing from said leading to trailing edge, said inner contour being recessed from said outer air bearing member; and a shoulder situated between said outer contour and said outer longitudinal edge of said body and traversing from said leading to trailing edge, said shoulder being recessed from said outer contour.

9. A slider as defined in claim 8 wherein said outer member is an outer rail having either transverse pressurization contour or edge blend; and said inner member is a tapered flat rail that is devoid of transverse pressurization contour or edge blend, thus minimizing defects to the processing of said slider.

10. The slider of as defined in claim 8 wherein said slider flies substantially in line with a direction of rotation of the media at an inside diameter of the media, wherein said slider flies at an approximately 20 degree yaw at an outside diameter of the media, and wherein the combination of said outer and inner air bearing surfaces enables said slider to fly at a substantially constant fly height as said slider traverses the media from said inside to said outside diameter.

11. A method of providing uniform flying height for a head-carrying slider relative to a disk-shaped rotating data storage media, comprising the steps of:

providing a slider body that is connected to a suspension arm for flying said body over said rotating media, said suspension arm applying a force to said body in a direction toward said rotating media, and said body traversing said rotating media in an arcuate plane between an outer diameter and an inner diameter of said rotating medium;

providing an outer longitudinal edge on said body, said outer longitudinal edge being adjacent to said outer diameter of said rotating media;

providing an inner longitudinal edge on said body, said inner longitudinal edge being adjacent to said inner diameter of said rotating media;

providing an outer air bearing member on said body, said outer air bearing member having a surface adjacent to said media, and said outer air bearing member being spaced from said outer longitudinal edge of said body;

providing an inner air bearing member on said body, said inner air bearing member having a surface adjacent to said media, and said inner air bearing member being coincident with said inner longitudinal edge of said body;

providing an outer transverse pressurization contour at an outer edge of said outer air bearing member and adjacent to said outer diameter of said rotating media, said outer contour being recessed from said surface of said outer air bearing member;

providing an inner transverse pressurization contour at an inner edge of said outer air bearing member and adjacent to said inner diameter of said rotating media, said inner contour being recessed from said surface of said outer air bearing member; and providing a shoulder between said outer contour and said outer longitudinal edge of said body, said shoulder being recessed from said outer contour.

12. The method of claim 11 including the steps of:

providing said outer air bearing member as an outer rail having either transverse pressurization contour or edge blend; and providing said inner air bearing member as a tapered flat rail that is devoid of transverse pressurization contour or edge blend.

13. A method providing a flying two-rail slider that carries a data transducing head, said slider cooperating in closely spaced relationship with a generally planar disk surface of a rotating data storage disk, said disk surface having an annular data storage area that is located within an inner disk circumference and an outer disk circumference, said method comprising the steps of:

providing a generally rectangular slider body;

providing said slider body with a generally planar surface that is adjacent to said disk surface;

providing said slider body with an inner longitudinal edge that is adjacent to said inner disk circumference;

providing said slider surface with an outer longitudinal edge that is adjacent to said outer disk circumference;

providing an outer air bearing rail on said slider surface at a location that is spaced from said outer longitudinal edge of said slider surface;

providing an outer TPC contour on said outer air bearing rail at a side of said outer rail that is adjacent to said outer longitudinal edge of said slider surface;

providing an inner TPC contour on said outer air bearing rail at a side of said outer rail that is opposite said outer TPC contour;

said two-TPC-contour outer rail providing slider fly height control to said slider;

providing an inner air bearing rail on said slider surface coincident with said inner longitudinal edge of said slider surface;

said inner rail being devoid of any TPC contour; and said inner rail providing control of slider roll moments and control of a stiffness characteristic of said slider.

* * * * *